UNITED STATES PATENT OFFICE 2,213,760

DENATURED ALCOHOL CONTAINING A PRIMARY AMINE AND CHLOROFORM

Louis J. Figg, Jr., Kingsport, Tenn., assignor to Eastman Kodak Company, Rochester, N. Y., a corporation of New Jersey No Drawing. Application October 23, 1937, Serial No. 170,660

7 Claims. (Cl. 202—77)

This invention relates to the denaturing of ethyl alcohol and to alcohol so denatured.

It is an object of my invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. It is a further object of my invention to provide denatured alcohol which, when an attempt is made to free it from its denaturants, becomes even more unpotable. Other objects will hereinafter appear.

I have discovered that a mixture of chloroform and a primary aliphatic amine containing from 3 to 8 carbon atoms is a particularly effective denaturant. The mixture of amine and chloroform is colorless, has a pleasant odor, and imparts a disagreeable taste to ethyl alcohol. The amine inhibits any corrosion which might take place due to hydrolysis of the chloroform. Now when a bootlegger attempts to "clean" denatured alcohol, he almost invariably uses a strong alkali such as sodium hydroxide. The usual procedure is to add the strong alkali to the still pot which contains the denatured alcohol, apply heat and distill. If the alcohol contains chloroform and a primary amine, when it is heated with a strong alkali the carbylamine reaction takes place, with the formation of an isonitrile with an unbearable, putrid odor. The isonitriles are soluble in alcohol, so that the unbearable odor persists in the alcohol after heating is discontinued. Thus the removal of the denaturants is rendered impracticable, and the alcohol is rendered absolutely unpotable.

Methylamine and ethylamine are too volatile to remain in the alcohol, so that they cannot be effectively used in the practice of my invention. However, the primary aliphatic amines containing from 3 to 8 carbon atoms, such as propylamine, butylamine, amylamine, hexylamine, heptylamine, and octylamine, can be used in carrying out my invention. I prefer to use propylamine or butylamine, because the boiling points of the corresponding isonitriles are such that the isonitriles cannot be removed from the alcohol by fractional distillation, no matter how hardy or ingenious the bootlegger might be, or how isolated his still. Ordinarily, however, higher-boiling amines would also be effective, because the frightful odor of the isonitrile and the resulting practical certainty of detection would cause the bootlegger to discontinue his operations.

I prefer to use about equal parts, by volume, of chloroform and amine. From 0.5 to 5 parts of the mixture, per 100 parts of 95% alcohol, is sufficient for denaturing, although more may be used if desired.

What I claim as my invention and desire to be secured by Letters Patent of the United States is:

1. Denatured ethyl alcohol containing, as essential denaturing elements, chloroform and a primary aliphatic amine of from 3 to 8 carbon atoms, whereby an isonitrile is formed when the denatured alcohol is heated with caustic alkali.

2. Denatured ethyl alcohol containing, as essential denaturing elements, chloroform and a monopropylamine, whereby an isonitrile is formed when the denatured alcohol is heated with caustic alkali.

3. Denatured ethyl alcohol containing, as essential denaturing elements, chloroform and a monobutylamine, whereby an isonitrile is formed when the denatured alcohol is heated with caustic alkali.

4. Denatured ethyl alcohol containing, as an essential denaturing element, from 0.5 to 5 parts, approximately, per 100 parts of 95% alcohol, of a mixture, in approximately equal proportions, of chloroform and a primary aliphatic amine of from 3 to 8 carbon atoms, whereby an isonitrile is formed when the denatured alcohol is heated with caustic alkali.

5. Denatured ethyl alcohol containing, as an essential denaturing element, from 0.5 to 5 parts, approximately, per 100 parts of 95% alcohol, of a mixture in approximately equal proportions of chloroform and a monopropylamine, whereby an isonitrile is formed when the denatured alcohol is heated with caustic alkali.

6. Denatured ethyl alcohol containing, as an essential denaturing element, from 0.5 to 5 parts, approximately, per 100 parts of 95% alcohol, of a mixture in approximately equal proportions of chloroform and a monobutylamine, whereby an isonitrile is formed when the denatured alcohol is heated with caustic alkali.

7. Ethyl alcohol containing as a denaturant a small quantity of a mixture in about equal molar proportions of a primary alkyl amine and chloroform.

LOUIS J. FIGG, Jr.

CERTIFICATE OF CORRECTION.

Patent No. 2,213,760. September 3, 1940.

LOUIS J. FIGG, JR.

It is hereby certified that error appears in the printed specification of the above numbered patent requiring correction as follows: Page 1, first column, line 30, after the word "primary" insert --aliphatic--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.